United States Patent [19]

Kaylo et al.

[11] 4,435,529

[45] Mar. 6, 1984

[54] TANNIN-EPOXY REACTION PRODUCTS AND COMPOSITIONS THEREOF

[75] Inventors: Alan J. Kaylo, Glenshaw; Nicholas T. Castellucci, Pittsburgh, both of Pa.

[73] Assignee: PPG Industries, Inc., Pittsburgh, Pa.

[21] Appl. No.: 347,845

[22] Filed: Feb. 11, 1982

[51] Int. Cl.³ .............................................. C08L 63/02
[52] U.S. Cl. ............................. 523/426; 204/181 C; 204/181 T; 523/410; 523/414; 523/415; 523/416; 523/523; 528/45; 528/110; 528/112; 528/361; 528/366; 528/421; 525/528; 525/533
[58] Field of Search ....................... 204/181 C, 181 T; 528/112, 45, 110, 361, 366, 421; 525/533, 523, 528; 523/414, 402, 400, 410, 415, 416, 426

[56] References Cited

U.S. PATENT DOCUMENTS

| | | | |
|---|---|---|---|
| 2,782,241 | 2/1957 | Gray et al. | 260/619 |
| 3,954,588 | 5/1976 | Hazan et al. | 204/181 |
| 4,039,353 | 8/1977 | Kulick et al. | 148/6.15 R |
| 4,054,466 | 10/1977 | King et al. | 148/6.27 |
| 4,086,182 | 4/1978 | Hengelhaupt et al. | 252/182 |
| 4,105,840 | 8/1978 | Cohen | 526/62 |
| 4,111,722 | 9/1978 | Reghi et al. | 148/6.15 R |
| 4,213,839 | 7/1980 | Azzerri et al. | 204/181 R |

FOREIGN PATENT DOCUMENTS 1200340 7/1970 United Kingdom .

OTHER PUBLICATIONS

"Anticorrosive Properties of Mimosa (Wattle) Tannin" by A. J. Seavell, J. Oil Col. Chem. Assoc., 1978, 61, pp. 439–462.

Troy Chemical Corp. product literature entitled AC-TAN$^{SP}$® Rust Converter.

General Electric product literature entitled ME-THYLON® Resins.

*Primary Examiner*—Theodore E. Pertilla
*Attorney, Agent, or Firm*—Godfried R. Akorli

[57] ABSTRACT

Novel compositions of matter comprising a reaction product of a tannin and epoxy material are hereby provided. The novel reaction products can be dispersed in an aqueous or solvent medium for use as a treating or coating composition which imparts excellent corrosion resistance to metals and exhibits excellent substrate and intercoat adhesion.

14 Claims, No Drawings

TANNIN-EPOXY REACTION PRODUCTS AND COMPOSITIONS THEREOF

This application is related to co-filed application Ser. No. 347,844, which discloses a novel process for pretreating metallic substrates electrophoretically.

BACKGROUND OF THE INVENTION

Field of the Invention:

The present invention relates to compositions useful in treating and coating metallic substrates so as to make them corrosion resistant. The invention also relates to a method of treating or coating metallic substrates and to the treated and coated substrates.

Brief Description of the Prior Art:

It is known in the art to prepare corrosion-resistant substrates by applying to the substrates compositions comprising metallic ions. Eminent in this art are phosphatizing treating compositions. Examples of the phosphatizing treating compositions are those containing iron phosphate, zinc phosphate or zinc calcium phosphate.

Although the metallic treating compositions are employed on many industrial lines, they, nonetheless, have certain disadvantages. They are expensive; besides the cost of the chemicals, a considerable capital investment is required for equipment. Also, the process for using these treating compositions results in pollution, the cleaning of which adds to the overall cost of operations.

The present invention employs tannin-epoxy reaction products to provide relatively inexpensive, yet highly effective means of producing corrosion-resistant substrates. Although tannins, by themselves, have been employed as corrosion inhibitors, they have been found to be lacking in substrate adhesion. Their reaction products are difficult to prepare; once prepared, they have been found to be either gelled and, therefore, undesirable for application to substrates, or rather unstable, upon storage. The novel tannin-epoxy reaction products are ungelled, stable and have excellent properties of substrate and intercoat adhesion and corrosion resistance.

SUMMARY OF THE INVENTION

In accordance with the foregoing, the novel compositions of this invention are ungelled reaction products of:
(A) an epoxy material, and
(B) a tannin.

In a preferred embodiment wherein the epoxy material is a polyepoxide, the tannin is reacted in an amount ranging from about 0.5 to 4.4 percent by weight, based on the total weight of the polyepoxide and the tannin.

The present invention also encompasses solutions or dispersions of the novel compositions which are useful in preparing treating and coating compositions. Aqueous dispersions or solutions thereof are, herein, preferred. The aqueous dispersions comprise the novel composition of an ungelled reaction product and a cationic salt group which can be a salt of ammonia, primary, secondary or tertiary amine, or an onium salt.

Further encompassed by the invention are the metallic substrates, particularly ferrous metal substrates which are treated or coated with the compositions of this invention.

In their use as treating or coating compositions, the novel compositions have been found to impact excellent corrosion resistance property to substrates treated therewith. It is believed that the excellent corrosion resistance property is attributable to substrate and intercoat adhesion properties of the novel compositions.

In their embodiment as coating compositions, the novel compositions are desirably combined with curing agents to provide improved properties such as solvent resistance and hardness of films obtained therefrom.

DETAILED DESCRIPTION

The novel compositions of the invention can be prepared by reacting an epoxy material and a tannin, as is set forth, more fully, herein.

The epoxy material may be of a resin class containing at least one 1,2-epoxy group. The resin may be, for example, among the general classes comonly referred to as polyethers, polyesters, acrylic, urethane, and the like, which contain the 1,2-epoxy group. Although monoepoxides such as phenyl glycidyl ether, n-butyl glycidyl ether and the like can be utilized, it is preferred that the epoxy material contain more than one 1,2-epoxy group per molecule, as such, it is a polyepoxide. Examples of suitable polyepoxides are described in U.S. Pat. Nos. 2,467,171; 2,615,007; 2,716,123; 3,030,336; 3,053,855 and 3,075,999.

Particularly preferred polyepoxides are polyglycidyl ethers of cyclic polyols, particularly polyphenols such as bisphenol A. These polyepoxides may be produced by etherification of a cyclic polyol with epichlorohydrin or dichlorohydrin in the presence of alkali. Examples of cyclic polyols are bis(4-hydroxyphenyl)-2,2-propane, 4,4'-dihydroxybenzophenone, bis(4-hydroxyphenyl)-1,1-isobutane, bis(4-hydroxytertiarybutylphenyl)-2,2-propane, bis(2-hydroxynaphthyl)methane, 1,5-hydroxynaphthalene or the like. Also, polyepoxides similarly produced from epichlorohydrin and novolaktype phenol resins may be employed.

Further illustrating the polyepoxides are acrylic polymers containing epoxy groups. Preferably, these acrylic polymers are polymers formed by copolymerizing an alpha, beta-ethylenically unsaturated epoxy-containing monomer, such as, for example, glycidyl acrylate or methacrylate with other copolymerizable alpha, beta-ethylenically unsaturated monomers. Any polymerizable monomeric compound containing at least one

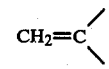

group, preferably in terminal position, may be polymerized with the unsaturated glycidyl compounds. Examples of such monomers include:
(1) monoolefinic and diolefinic hydrocarbons;
(2) halogenated monoolefinic and diolefinic hydrocarbons;
(3) esters of organic and inorganic ethylenically unsaturated acids or the esters thereof;
(4) organic nitriles.

The acrylic polymers and their method of preparation are known in the art. Examples thereof are disclosed in U.S. Pat. No. 3,928,156, column 4, line 40, through column 6, line 68, which is herein incorporated by reference.

In preparing the novel compositions, the tannin is reacted with the epoxy material in an amount sufficient to produce an ungelled epoxy-tannin reaction product. Typically, the tannin is reacted with the polyepoxides in an amount ranging from about 0.5 to 4.4, and preferably from about 1.0 to 2.0 percent by weight, based on the total weight of the tannin and the polyepoxide. As would be realized, the amount in which the tannin is reacted with the epoxy material would vary from the afore-stated amount, in instances when monoepoxides are reacted therewith, preferably in conjunction with the polyepoxides.

Of the class tannins useful, herein tannic acid is, presently, the most preferred member. Tannic acid is a lustrous, faintly yellowish, amorphous powder occurring as glistening scales or spongy mass. Other tannins which are envisaged as being useful in the present invention (as well as the tannic acid) are extracted from plants and are, generally, named to correspond with the source of extraction, for example, a tannin derived from oak tree is named oak tannin. They are classified as hydrolyzed and condensed tannins. A detailed and apt description of the tannins is provided by Kirk-Othmer *Encyclopedia of Chemical Technology*, (1954), Vol. 13, pages 578–599, which is incorporated, herein, by reference.

The reaction conditions for the preparation of the novel compositions are as follows. Catalysts such as phosphonium salts, for example, ethyl triphenyl phosphonium acetate, ethyl triphenyl phosphonium iodide and tetrabutyl phosphonium acetate are usually present in the preparation of the novel composition of the present invention. The amount of catalyst ranges from about 0.1 to about 2 percent based on total weight of the reactants. A solvent is not necessary in this reaction even though one is often used in order to afford better control of the reaction. Preferably, the reaction is conducted over the temperature range of 100° to 160° C. for about 1 to 4 hours; the time and temperature, of course, depend on one another and on the specific reactants, catalysts and other reaction conditions.

The resulting novel compositions are, advantageously, ungelled and can be dispersed or solubilized, readily, in appropriate diluents, water, or water-solvent mixtures.

Aqueous dispersions or solutions of the invention can be prepared by dispersing in water the novel compositions of the invention which are water-dispersible. The novel compositions can be made water-dispersible with a water-solubilizing group such as a cationic group. The water-dispersible composition can be prepared by incorporating a cationic group into the novel composition, preferably a cationic salt group or its precursor by reacting it with the novel composition. An alternate method of preparing the water-dispersible composition comprises reacting the cationic group or its precursor, the epoxy material and the tannin in a so-called "one shot" process. The cationic group is present in the novel composition in an amount sufficient to render the composition dispersible in water, and electrophoretic when it is intended as an electrophoretic composition.

Typically, the cationic group is an onium salt, which is preferred, or an amine salt. Illustrative of the onium salts are ammonium salts which are preferred herein. Generally, the ammonium salts are prepared by reacting the novel composition with an ammonium salt precursor which is, for instance, a tertiary amine salt. An illustrative example of the ammonium salt precursor is dimethylethanolamine lactate. U.S. Pat. Nos. 3,962,165; 3,894,922 and 3,959,106, which are, hereby, incorporated by reference, more fully describe the onium salts as to their nature and method of preparation.

The amine salts can be salts of ammonia, primary amine, secondary amine and tertiary amine. The amine salts can be incorporated into the novel composition by reacting the novel compositions with ammonia, primary or secondary amine, followed by at least partially acid-neutralizing the resulting amine reaction product. Examples of amines useful herein are mono- or dialkylamine such as ethylamine, diethylamine; hydroxyalkylamine such as diethanolamine. Examples of acids which are useful in neutralizing the amines are lactic acid, acetic acid and phosphoric acid.

Solvent-based solutions of the novel compositions can be prepared, by thinning the above reaction product with diluents such as alcohols: 2-ethylhexanol, ethylene glycol monobutyl ether; ketones: methyl isobutyl ketone, and the like.

The solutions or dispersions of the novel compositions have been found to be ungelled and stable. By the term "stable" herein is meant that the solutions or dispersions of the novel composition remain liquid and can be readily adapted for the various means of application. At a high solids content, the dispersions or solutions may turn "pasty", upon storage, but would, upon heating, become liquid and suitable for application to substrates.

As set forth hereinabove, the solutions or dispersions of the novel composition are employed as a treating composition. The concentration of the novel composition in a treating composition can vary depending on application methods and conditions such as time and temperature. Generally, the concentration is such that the treating composition would impart effective corrosion resistance properties to substrates treated therewith. The water-based treating composition which is preferred herein comprises from about 1 to 30 percent by weight of the novel composition, based on the weight of the treating composition. The solvent-based treating composition comprises from about 1 to 60 percent by weight, based on the total weight of the treating composition.

The treating compositions can be applied to the surface of the substrate in any convenient manner such as by immersion, spraying, or wiping the surface either at room temperature or at elevated temperature. When desirable, the aqueous dispersions of the novel composition can be electrodeposited on substrates, under the general conditions of electrodeposition, without compromising the film properties of latter applied coatings (whether electrocoated or not).

The applied potential is determined by factors such as the nature of the electrophoretic composition, as to its conductivity, its temperature, the alloted time for passage of current, and other factors such as electrode spacing. In the practice of this invention, the applied potential is such as provides effective pretreatment of the substrates. It would be realized that the specific combinations and permutations of the factors that determine the applied potential would be determined by testing. The current density of the electrophoretic process is below 0.1 ampere per square inch of electrode surface, for about 5 to 30 seconds. It is noteworthy that the treated substrates remain electroconductive in instances when they are to be subsequently electrocoated.

After the application, the substrate is dried or cured. The substrates treated with compositions of this invention have been found to display good corrosion resistance properties. Substrates which have been cured by baking after they have been treated with the compositions of this invention display a more improved corrosion resistance. They can be exposed to the atmosphere without danger of atmospheric oxidation on the surface. After drying or curing, the metal substrates can be coated with a decorative or protective coating. A variety of substrates such as bare cold-rolled steel, iron phosphatized steel, and galvanized steel can be treated with the compositions of this invention, Particularly, remarkable results are obtained when ferrous metal substrates are treated in the manner of this invention.

It would be understood that by "treating" or "pretreating" substrates, in accordance with this invention, the surface of the substrates become chemically treated in a manner that effects prevention or retardation of corrosion. Said chemical treatment does not require the formation of films of measurable thickness. In instances when the treating composition forms films of measurable thickness, the effectiveness of the film as a pretreatment would depend largely on its substrate and intercoat adhesion. Advantageously, the compositions of this invention exhibit excellent substrate and intercoat adhesion. In contrast to the treating compositions, the coating compositions of this invention form protective or decorative films of measurable thickness. In the form of coating compositions, the novel compositions are desirably combined with curing agents so as to provide protective films of improved properties. In combination with curing agents, the novel compositions contain active hydrogens which are non-reactive at ordinary temperatures, but reactive at elevated temperatures with the curing agents. Examples of active hydrogens are hydroxyl, thiol, primary amine, secondary amine (including imine) and carboxyl, with hydroxyl being preferred.

The useful curing agents are those which are capable of reacting with the active hydrogens to form a cross-linked product. Examples of suitable curing agents are phenolic resins, aminoplasts, and blocked polyisocyanates which are preferred.

Suitable aminoplasts for use in the invention are described in U.S. Pat. No. 3,937,679 to Bosso et al in column 16, line 3, continuing to column 17, line 47, which is hereby incorporated by reference. As disclosed in the afore-mentioned portions of the U.S. Pat. No. 3,937,679 patent, the aminoplast can be used in combination with methylol phenol ethers. The aminoplast curing agent usually constitutes about 1–60 and preferably 5–40 percent by weight of the resinous composition based on total weight of the acid-solubilized resinous vehicle and the aminoplast.

Suitable capped or blocked polyisocyanate, for use in the invention, are described in U.S. Pat. No. 4,104,147, column 7, line 36, continuing to column 8, line 37, which is hereby incorporated by reference. Sufficient capped or blocked polyisocyanate is present in the coating system such that the equivalent ratio of latent isocyanate groups to active hydrogens is at least 0.1:1 and preferably about 0.3 to 1:1.

Coating compositions comprising the novel composition can be applied to the surface of the substrate in any convenient manner such as by immersion, spraying, or wiping the surface either at room temperature or at elevated temperature. When desirable, the coating compositions can be electrodeposited on a variety of substrates. The substrates coated therewith are typically baked at temperatures ranging from 90° to 210° C., for about 1 to 30 minutes.

In their use as coating compositions, the instant dispersions or solutions can be employed by themselves or with other resinous materials as film-formers. It is, also, contemplated that the novel compositions can be used as additives to coating compositions. The coating compositions contain the novel composition in amounts sufficient to impart corrosion resistance properties to substrates coated therewith. In aqueous-based coating compositions, typically, the amount of the novel composition, present in the coating composition, ranges from about 5 to 32, and preferably about 5 to 15 percent by weight of the total weight of the composition.

The coating compositions can contain coating additives such as pigments, flow control agents, surfactants, thixotropes, extenders, etc. When the coatings are applied to substrates, there are obtained films of appreciable build having excellent appearance and substrate and intercoat adhesion and corrosion resistance.

This and other aspects of the invention are further illustrated by the following examples. It is to be understood that the following examples and other aspects of the invention described herein are not intended to be limiting; rather, other equivalents of the invention are intended to be covered, as well. It is to be further understood that all percentage compositions expressed herein are parts by weight unless otherwise stated.

EXAMPLE I

This example illustrates the preparation of the novel composition of the present invention, and the quaternary ammonium salt derivative thereof. The following charge was used in the preparation:

| Ingredients | Parts by Weight (Grams) |
| --- | --- |
| EPON 1001* | 1500 |
| Tannic acid | 20 |
| 2-ethylhexanol | 156 |
| Ethyltriphenyl phosphonium acetate (70% in methanol) | 10.8 |
| Dimethylethanolamine lactate (75% in deionized water) | 251.1 |
| Deionized water | 54 |
| Deionized water | 858.6 |

*EPON 1001 is a polyglycidyl ether of bisphenol A having an epoxy equivalent of about 500 and a molecular weight of about 1000, commercially available from Shell Chemical Company.

The EPON 1001 was charged to a properly equipped reaction vessel and heated to 145° C. There was then introduced into the reaction vessel all the tannic acid. The resulting mixture was heated until it became homogeneous. At 151° C., the ethyltriphenyl phosphonium acetate was added, dropwise, to the mixture. There resulted an exotherm with the temperature rising to 158° C. Thereafter, the mixture was heated to 160° C. and the 2-ethylhexanol was added, dropwise. About an hour after the commencement of the addition of the 2-ethylhexanol, at 135° C., with the heating means turned off, the dimethylethanolamine lactate in the first portion of water was slowly added, dropwise, over a period of an hour, to the mixture. About an hour thereafter, and over a temperature range of 95° to 100° C., the second portion of water was added to thin the mixture.

There was then obtained a water-dispersed quaternized epoxy-tannin reaction product having a resin solids content of 60 percent and epoxy value of infinity.

EXAMPLE II

This example illustrates the solvent-based compositions of the novel compositions of this invention. The following were used in the preparation:

| Ingredients | Parts by Weight |
| --- | --- |
| EPON 1001 | 200 |
| Tannic acid | 3.48 |
| Ethyltriphenyl phosphonium acetate (70% in methanol) | 1.60 |
| TEXANOL** | 17.9 |

**2,2,4-trimethylpentane-1,3-diol monoisobutyrate.

The EPON 1001 was charged to a properly equipped reaction vessel, heated to 152° C., followed by the addition of the tannic acid. The temperature of the resulting reaction mixture rose slightly to 155° C., whereat the ethyltriphenyl phosphonium acetate was added. There was a resulting exotherm and a rise in temperature to 158° C., whereat the TEXANOL was added. The resulting mixture was viscous; upon addition of 184 grams of monobutyl ether of ethylene glycol, the resulting composition became pourable and had a resin solids content of about 60 percent.

EXAMPLE III

| Ingredients | Parts by Weight |
| --- | --- |
| EPON 1001 | 200 |
| TEXANOL | 17.9 |
| Tannic acid | 3.48 |
| Dimethylethanolamine lactate (75% in deionized water) | 28.7 |
| Monobutyl ether of ethylene glycol | 4.5 |
| Ethyltriphenyl phosphonium acetate (70% in methanol) | 1.6 |
| Deionized water | 285.4 |

The EPON 1001 was heated to 123° C., followed by the addition of the TEXANOL. A premix of the tannic acid and the dimethylethanolamine lactate was prepared. To the premix was added the butyl Cellosolve. The mixture of tannic acid, dimethylethanolamine lactate and butyl Cellosolve was slowly added to the reaction vessel over a temperature range of 122°-116° C. in a period of 15 minutes. At the end of this addition, the ethyltriphenyl phosphonium acetate catalyst was added for the purpose of completing the epoxy reaction (there was no exotherm). About an hour thereafter, and over the range of 118°-94° C., the deionized water was added to the resulting mixture so as to let it down to a total resin solids content of about 30 percent.

EXAMPLE IV

This example illustrates the water-based composition of the present invention and the corrosion resistance property thereof. The composition used herein is prepared as follows:

| Ingredients | Parts by Weight (Grams) |
| --- | --- |
| EPON 1001 | 500 |
| Tannic acid | 8.5 |
| 2-ethylhexanol | 52 |
| Ethyltriphenyl phosphonium acetate (70% in methanol) | 3.6 |
| Dimethylethanolamine lactate (75% in deionized water) | 83.7 |
| Deionized water | 18 |
| Deionized water | 286.2 |

The novel composition was prepared in essentially the same manner as described in Example I. The resulting composition, having a resin solids content of 70.6 percent was further dispersed in water to form an aqueous dispersion of 10 percent resin solids.

The above aqueous dispersion was used to treat panels of cold-rolled steel by a dipping application method. Two sets of the substrates were dipped in the dispersion for two minutes at ambient temperature; the two sets were, respectively, baked at 325° C. for 20 minutes and at 375° C. for 10 minutes. The treated substrates were top coated by spraying with DURACRON 200 (available resin of PPG Industries, Inc.) baked at 375° F. for 8 minutes, and then scribed with an "X" mark and subjected to a corrosion resistance test so as to evaluate the efficacy of the pretreatment composition.

Evaluation: The substrates were put into a salt spray chamber of 5 percent sodium chloride solution at 100 percent humidity and a temperature of 38° C. over a period of 1 week. After removal from the salt spray chamber, the panels were washed thoroughly with deionized water, dried and then subjected to a "tape pull-off" test. Scribe creepage and film delamination were evaluated.

Control panels of (1) untreated cold-rolled steel, (2) treated cold-rolled steel (with 10 percent tannic acid solution is deionized water), and (3) treated cold-rolled steel (with iron phosphate conversion coating) were top coated with DURACRON 200 and baked as described above. The baked control panels were then subjected to the same testing and evaluation as described above.

It was found that the panels treated with the instant treating compositions and the panels treated with iron phosphate conversion coating showed no appreciable scribe creepage and no film delamination. In contrast, untreated panels and panels treated with 10 percent tannic acid solution showed no significant scribe creepage but delaminated completely.

We claim:

1. A composition of matter comprising an ungelled reaction product obtained by the heating of:
   (A) a 1,2-epoxy material, and
   (B) a tannin in an amount sufficient to provide an ungelled reaction product.

2. A composition of matter as recited in claim 1, wherein the epoxy material is selected from the group consisting of epoxy-containing polyethers, epoxy-containing polyesters, epoxy-containing polyurethanes and epoxy-containing acrylics.

3. A composition of matter as recited in claim 2, wherein the epoxy material is a polyepoxide.

4. A composition of matter as recited in claim 3, wherein the tannin is reacted in an amount ranging from about 0.5 to 4.4 percent by weight based on the total weight of the tannin and the polyepoxide.

5. A composition of claim 4, wherein the tannin is present in an amount ranging from about 1.0 to 2.0 percent by weight based on the total weight of the tannin and the polyepoxide.

6. A water-dispersible composition comprising a cationic salt group and an ungelled reaction product as recited in claim 1.

7. A water-dispersible composition comprising a cationic salt group and an ungelled reaction product as recited in claim 3.

8. A composition of claim 1, wherein the tannin is tannic acid.

9. A composition of claim 6, wherein the cationic salt group is an amine salt or an onium salt.

10. A composition of claim 9, wherein the onium salt is a quaternary ammonium salt.

11. A composition of claim 10, wherein the quaternary ammonium salt is derived from dimethylethanolamine lactate.

12. A solvent-based treating composition comprising the composition of matter as recited in claim 1 and a diluent.

13. A water-based treating composition comprising a composition of matter as recited in claim 6, and water.

14. A coating composition comprising:
 (1) a composition of matter as recited in claim 1 or 6, which comprises an active hydrogen group, and
 (2) a curing agent which is an aminoplast or a blocked isocyanate.

* * * * *